United States Patent [19]

Krebs

[11] 4,015,234
[45] Mar. 29, 1977

[54] APPARATUS FOR MEASURING AND FOR WIRELESS TRANSMISSION OF MEASURED VALUES FROM A BORE HOLE TRANSMITTER TO A RECEIVER ABOVEGROUND

[76] Inventor: Erich Krebs, Rosskampstrasse 67D, 3 Hannover, Germany

[22] Filed: Apr. 3, 1975

[21] Appl. No.: 564,666

[30] Foreign Application Priority Data

Apr. 3, 1974 Germany .................. 2416063

[52] U.S. Cl. ................ 340/18 NC; 325/28; 340/18 LD
[51] Int. Cl.² .............. G01V 1/40; H04B 13/02
[58] Field of Search ....... 340/18 LD, 18 P, 18 NC; 325/28

[56] References Cited

UNITED STATES PATENTS

| | | | |
|---|---|---|---|
| 3,150,321 | 9/1964 | Summers | 340/18 NC |
| 3,186,222 | 6/1965 | Martin | 340/18 LD |
| 3,315,224 | 4/1967 | Ferguson | 340/18 NC |
| 3,333,239 | 7/1967 | Silverman | 340/18 NC |
| 3,831,138 | 8/1974 | Rammner | 340/18 NC |
| 3,878,790 | 4/1975 | Meyer | 102/70.2 R |

*Primary Examiner*—Howard A. Birmiel
*Attorney, Agent, or Firm*—Robert E. Burns; Emmanuel J. Lobato; Bruce L. Adams

[57] ABSTRACT

Apparatus for transmitting measurement information from a deep well being drilled to the surface comprises a receiving unit aboveground and a transmitting unit on a connecting section of the drill rod just above the drill bit. The transmitting unit comprises two spaced electrodes encircling the connecting section of the drill rod, means for connecting the electrodes to the terminals of a capacitor, an electrical source for charging the capacitor and a short circuiting switch for intermittently short circuiting the capacitor under control of one or another transducing elements for sensing the values to be measured e.g. the inclination of the bore, the direction of the inclination, the orientation of a directional drilling tool and temperature in the bore. The resulting coded energy pulses are transmitted through the earth to the receiving unit comprising an amplifying receiver connected to two spaced electrodes driven into the earth. Selection of the measurement to be transmitted is controlled by an aboveground control transmitter likewise employing the short circuiting of a capacitor connected to spaced electrodes in the ground. A change-over switch in the underground unit alternately connects the electrodes of the underground unit to a receiving circuit for receiving control signals from the aboveground control transmitter in order to select the measurement to be transmitted, and then to the capacitor for transmitting the selected measurement.

10 Claims, 2 Drawing Figures

FIG. 1
FIG. 2
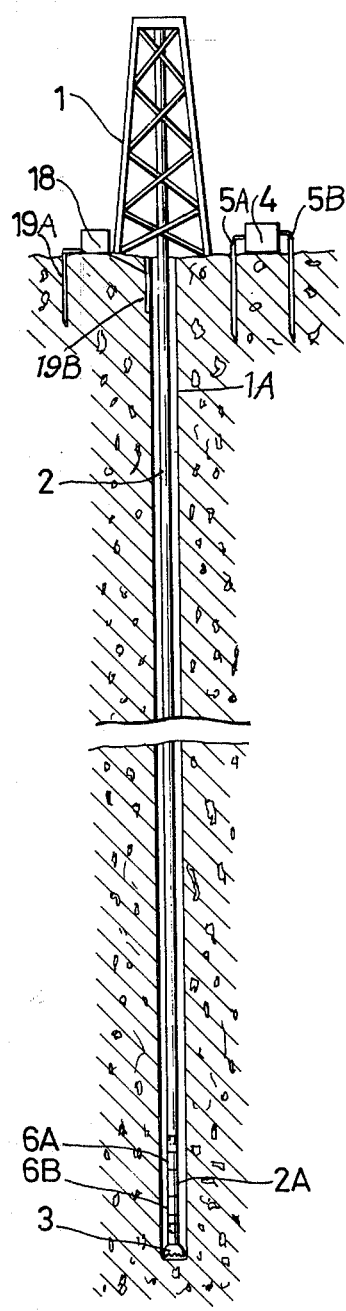
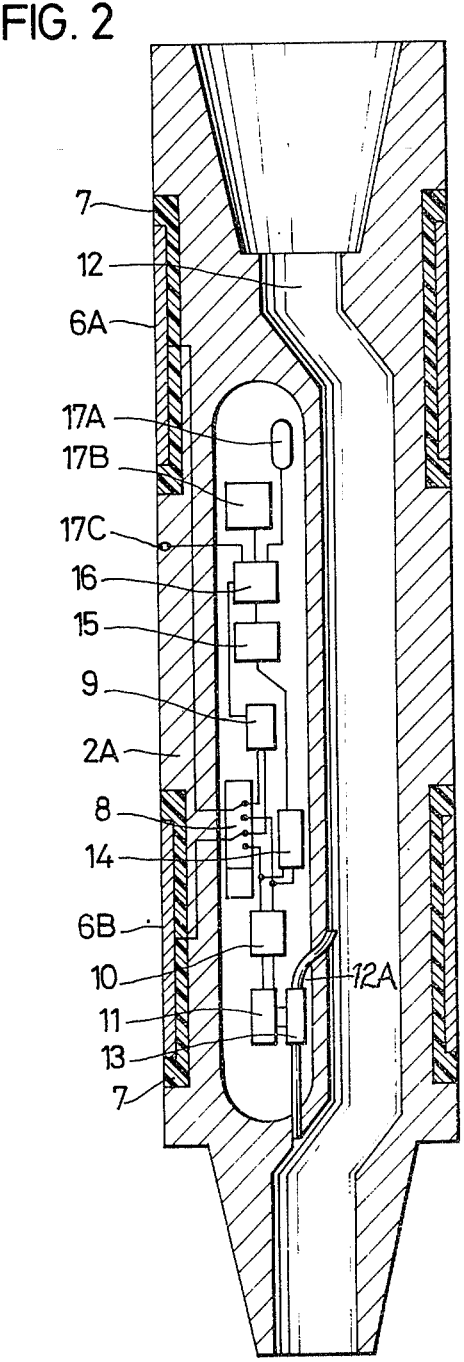

APPARATUS FOR MEASURING AND FOR WIRELESS TRANSMISSION OF MEASURED VALUES FROM A BORE HOLE TRANSMITTER TO A RECEIVER ABOVEGROUND

The present invention relates to apparatus for making measurements underground in a well or bore hole and transmitting these measurements without wires or cables to a receiver aboveground. The apparatus comprises an underground unit provided in or on the drill rod behind the drill bit of a well drilling rig and a receiver located aboveground. The underground unit comprises a source of electrical energy, one or more measuring transducers and a transmitter with one or more electrodes. The aboveground unit comprises a receiver with one or more receiving electrodes stuck into the ground.

In drilling for oil deposits, particularly in directional drilling, it is necessary to perform measurements on the inclination of the bore hole, the direction of the inclination, the orientation of a directional drilling tool and for other purposes, the pressure, temperature and other values. Without the first mentioned measurements (inclination, direction of inclination and orientation of the directional drilling tool) it is for example not possible to carry out drilling in the desired direction.

Heretofore, the necessary measurements have been made by a probe or measuring device that is lowered into the bore hole and records the measurements photographically or transmits them by cable to the surface. This requires however that the drilling operation must be interrupted for a considerable period of time for the introduction of the probe. Such interruption of the drilling operation unfavorably affects the price of a well since the high per hour drilling cost goes on while the boring tools are idle. Also, the interruption unfavorably affects the drilling technique since the drill bit or drill rod may freeze when stopped with the resultant danger of the drill rod being broken.

For these reasons, means has long been sought for making measurements while drilling and transmitting them to the surface.

However, these efforts have not met with success in deep drilling such as is necessary in drilling for oil deposits. All attempts to use electromagnetic means and high frequency as the transmitting medium have proved unsuccessful as these frequencies are immediately absorbed by the earth formation. Experiments with sonic and ultrasonic frequencies have likewise proved unsuccessful as the noise of the circulating fluid inside the drilling column is so great that the signal is not distinguishable from the noise. The transmission of measurement data through impulses superimposed on the circulation column functions only to a depth of perhaps 1,000 meters. Attempts to magnetize the drill rod with a transmitting coil above the drill bit and a receiving coil enveloping the drill rod aboveground have by reason of the great amount of energy required likewise had only very limited success at great depths. Wireless transmission with low frequency electromagnetic waves have been successful only over short distances.

The present invention avoids these disadvantages and makes possible a wireless transmission of data obtained from the drill line even at a great depth.

To solve this problem the invention employs apparatus of which the essential characteristic is that underground on the drill rod two sufficiently spaced electrodes are arranged in the form of plates surrounding and flush with the drill rod. These two plates are connected respectively with the terminals of a capacitor which is chargeable from a source of electrical energy. The capacitor electrodes are connectible by a short circuit switch with the electrodes on the drill rod and with one another through a ground connection. The switching frequency or percent on-time of the switch is controlled through an instrument transformer in accordance with the measurement it is desired to transmit. Aboveground, the discharge pulses of the capacitor are received by two electrodes which are stuck in the earth and are sufficiently spaced from one another. The receiving electrodes are connected with the input of an amplifier at the output of which the transmitted pulses can be observed or recorded.

Optionally, the drill rod can be used as the second electrode underground and aboveground as a possible simplification. Thus, one terminal of the capacitor underground and one input terminal of the amplifier aboveground can be connected directly to the drill rod.

Through the present invention it has become possible by means of capacitor discharge through which the great energy stored in the capacitor is discharged in very short time intermittently in the earth formation to transmit signals from great depths underground to the surface. Such a capacitor discharge exhibits a wide frequency spectrum. Through this wide frequency spectrum it is possible to assure effective transmission of the signal since in this frequency spectrum there are always found frequencies which are not as strongly absorbed or reflected as others by the earth formation.

Batteries can be used as the source of electrical energy but for operation over a long period of time, it is advantageous to use a generator that is driven by the circulating fluid in the hollow drill rod. In this manner, it is possible to have available a constant source of electrical energy for the undergound transmission unit. Because of its being constantly available, this source of electrical energy is in many cases preferable to accumulators or batteries arranged on or in the drill rod.

Conversely, a transmission of signals from aboveground to underground can be effected through capacitor discharge in the same manner as transmission from underground to overground. On this ground, it is advantageous when the insulated electrode plates on the drill rod are connectible with a receiver circuit. This has the advantage that the individual underground measuring instruments can be controlled from aboveground and can be connected in specific manner to the drilling apparatus, for example the directional drilling tool.

Hereto serves advantageously a time controlled switch which is arranged in or on the drill rod and by which the electrode plates on the drill rod are connected for an interval of time with the receiving circuit and thereafter for an interval of time with the capacitor. It is thereby possible for a certain time to receive measurement control signals at a great depth and subsequently to carry out the measurements and transmit the data thereby obtained to the surface. When there are several measuring devices, a selector switch is preferably provided in or on the drill rod and is controlled by a receiving circuit which is likewise located in or on the drill rod. According to the control signal this connects the desired measuring device with the instrument transformer and the transmitter during the transmitting time interval.

The nature of the present invention will be more fully described with reference to a preferred embodiment schematically illustrated in the accompanying drawings in which:

FIG. 1 is a schematic representation of measuring apparatus in accordance with the invention;

FIg. 2 is a schematic longitudinal section of a drill rod connector preferably of nonmagnetic material which is located above the drill bit and which contains the apparatus for making measurements and for wireless transmission of these measurements to the surface.

A drill rod 2 is suspended from a derrick 1 in a well having a casing 1A and carries a drill bit at its lower end. Aboveground, on the earths surface there is a transmitter 4 which is connected with two measuring electrodes 5A and 5B which are stuck in the ground and extend sufficiently deep to make good contact with the earth. Just above the drill bit 3 there is a drill rod connecting section 2A which is preferably formed of nonmagnetic material. Two electrode plates 6A and 6B are provided on the drill rod connecting section 2A and are spaced apart from one another as far as possible. The electrodes 6A, 6B are in the form of annular bands which surround the drill rod section 2A and are insulated therefrom by insulating material 7. The electrodes are preferably recessed so as to be flush with the surface of the drill rod section 2A. Inside the section 2A there is provided a switch 8 by means of which the two electrodes 6A and 6B can be connected alternatively with a receiving circuit 9 arranged inside the drill rod connecting section 2A or with the terminals of a capacitor 10 which is fed by an electrical generator 11. The generator 11 is driven by a small turbine 13 which is driven by circulating fluid supplied from the channel 12 of the drill rod through a bypass passage 12A. The capacitor 10 can be short circuited by means of a short circuit switch 14. The short circuit switch 14 is controlled by an instrument transformer 15 which is connected with a selector switch 16 by means of which the instrument transformer 15 can be connected selectively with the different measuring devices 17A, 17B and 17C.

The pulse form electrical energy conducted from the capacitor 10 over the short circuit switch 14 to the earth formation flows from electrode 6A to electrode 6B or vice versa whereby by reason of the three dimensional extension of the underground formation and the consequent interconnected resistance paths, the flow lines of the current are widely distributed. Aboveground the sufficiently widely spaced two electrodes 5A and 5B can pick up a small potential difference on one flow line and this potential difference is amplified by the amplifier 4 and fed to the indicator or recorder.

The individual pulses of a pulse train which are coded according to a code system to transmit a measured value are spaced sufficiently apart time-wise to provide a clear signal, for example the spacing between pulses can be of the order 1 to 20 seconds.

A transmitter 18 is provided aboveground to control the selector switch 16 through the receiver circuit 9. The energy of the transmitter 18 is fed to electrodes 19A and 19B and from there transmitted through the ground to electrodes 6A and 6B of the underground receiving and transmitting unit. While both of the electrodes 19A and 19B can be driven in the ground as are electrodes 5A and 5B, the electrode 19B is shown in contact with the casing 1A while the electrode 19A is driven in the ground spaced at a suitable distance from the well casing. The transmitter 18 can also work through the short circuiting of a condenser as has been described with respect to the underground transmitter. The transmitter 18 serves to control the selector switch 16 by means of the receiver circuit 9.

The switch 8 of the underground unit is controlled remotely from aboveground or is controlled by a suitable timing device or timing circuit so that the electrodes 6A and 6B are alternately connected to the terminals of the receiving circuit 9 and the terminals of the capacitor 10. When the electrodes 6A and 6B are connected to the receiving circuit 9 signals transmitted by the aboveground transmitter 18 are received by the terminals 6A, 6B and transmitted to the receiving circuit 9 so as to control the selector switch 16 to connect one of the transducers or sensing devices 17A, 17B or 17C through the selector switch 16 and instrument transformer 15 to the short circuit switch 14. When the electrodes 6A and 6B are connected to the terminals of the capacitor 10 they serve as transmitting electrodes to transmit to the aboveground receiver 4 a signal generated through the periodic closing of the short circuit switch 14 under control of the measuring device to which it is currently connected. Thus the desired measurement is transmitted to the receiver 4 where it is displayed or recorded.

As the several components of the apparatus illustrated in the drawings are of known construction, no more detailed illustration or description of them is believed to be required. Moreover, while a preferred embodiment of the invention has been shown in the drawings and is herein particularly described, it will be understood that modifications may be made while still retaining the principles and advantages of the invention. For example the electrodes of the aboveground units, instead of being driven into the ground as shown, can be widely spaced plates which are buried in the earth and are spaced from one another horizontally or vertically.

What I claim and desire to secure by Letters Patent is:

1. Apparatus for wireless transmission of measurement values from a probe in a well being drilled by a drill bit on a sectional drill rod, comprising an underground unit on a connecting section of the drill rod just above the drill bit and an aboveground unit at the earths surface, said aboveground unit having spaced terminals in the earth, the underground unit comprising two axially spaced electrodes on said connecting section of the drill rod and insulated from one another, a capacitor having its terminals connected respectively with said electrodes, an electrical energy source for charging the capacitor, a short circuiting switch for short circuiting said capacitor, sensing means for sensing measurement values it is desired to transmit and means connecting said sensing means to said short circuiting switch to control the frequency or duration of closing of said short circuiting switch in accordance with a coded value to be transmitted, the energy pulses resulting from said short circulating being transmitted from said electrodes through the earth to said terminals of said aboveground unit.

2. Apparatus according to claim 1, in which said drill rod is hollow for the circulation of fluid therethrough, and in which the electrical energy source comprises a generator and means driven by said circulating fluid for driving said generator.

3. Apparatus according to claim 1, in which said sensing means comprises a plurality of sensing elements for sensing different values, and said underground unit comprises means for selectively connecting said sensing elements with said short circuiting switch.

4. Apparatus according to claim 3, in which said aboveground unit further comprises control signal transmitting means and said underground unit further comprises a receiving circuit for receiving control signals transmitted from said aboveground unit, said receiving circuit being connected to and controlling said selective connecting means, whereby the selective connection of said sensing elements to said short circuiting switch is controlled by signals transmitted from aboveground.

5. Apparatus according to claim 4, in which said underground unit comprises a change-over switch for alternatively connecting said electrodes with said receiving circuit for reception of sensing element selection control signals and with said capacitor for transmission of measurement values from the selected sensing element.

6. Apparatus according to claim 5, in which said change-over switch is time sequence controlled to connect said electrodes with said receiving circuit for a predetermined period of time and then to connect said electrodes with said capacitor for a succeeding period of time.

7. Apparatus according to claim 4, in which said control signal transmitting means of said aboveground unit comprises a capacitor connected to said terminals in the earth and an intermittently operated short circuiting switch for short circuiting said capacitor to transmit control signals to said receiving circuit.

8. Apparatus according to claim 1, in which the drill rod forms one electrode of the underground unit and of the aboveground unit.

9. Apparatus according to claim 1, in which said aboveground unit comprises an amplifying circuit connected with said two terminals in the ground at a distance from one another.

10. Apparatus according to claim 1, in which said electrodes comprise two annular plates encircling said connecting section of the drill rod and insulated therefrom.

* * * * *